United States Patent
Malki (10) Patent No.: US 10,823,241 B2
(45) Date of Patent: Nov. 3, 2020

(54) DISC BRAKE

(71) Applicant: Meritor Heavy Vehicle Braking Systems (UK) Limited, Cwmbran, Gwent (GB)

(72) Inventor: Refaat Malki, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 72 days.

(21) Appl. No.: 16/057,059

(22) Filed: Aug. 7, 2018

(65) Prior Publication Data
US 2019/0063528 A1    Feb. 28, 2019

(30) Foreign Application Priority Data

Aug. 31, 2017   (EP) .................................. 17188751

(51) Int. Cl.

| | |
|---|---|
| *F16D 55/226* | (2006.01) |
| *F16D 65/18* | (2006.01) |
| *F16D 65/00* | (2006.01) |
| *F16D 65/56* | (2006.01) |
| *F16D 55/227* | (2006.01) |
| *F16D 121/04* | (2012.01) |
| *F16D 55/00* | (2006.01) |
| *F16D 55/225* | (2006.01) |
| *F16D 121/14* | (2012.01) |

(Continued)

(52) U.S. Cl.
CPC .......... *F16D 65/18* (2013.01); *F16D 55/227* (2013.01); *F16D 65/0043* (2013.01); *F16D 65/0056* (2013.01); *F16D 65/0068* (2013.01); *F16D 65/567* (2013.01); *F16D 55/225* (2013.01); *F16D 66/026* (2013.01); *F16D 2055/0016* (2013.01); *F16D 2121/04* (2013.01); *F16D 2121/14* (2013.01); *F16D 2125/28* (2013.01); *F16D 2250/0084* (2013.01)

(58) Field of Classification Search
CPC .... F16D 65/0043; F16D 65/56; F16D 65/567; F16D 2127/04
See application file for complete search history.

(56) References Cited

U.S. PATENT DOCUMENTS

| | | |
|---|---|---|
| 3,905,455 A | 9/1975 | Martins |
| 4,019,611 A | 4/1977 | Ritsema |

(Continued)

FOREIGN PATENT DOCUMENTS

| | | |
|---|---|---|
| DE | 4110869 A1 | 10/1992 |
| DE | 4212352 A1 | 10/1993 |

(Continued)

OTHER PUBLICATIONS

European Patent Office, Extended European Search Report for Application Serial No. EP17188751.6-1012, dated Feb. 26, 2018.

(Continued)

*Primary Examiner* — Bradley T King
(74) *Attorney, Agent, or Firm* — Brooks Kushman PC (57) ABSTRACT

A disc brake having an actuation mechanism, a wear adjustment mechanism that includes a manual rewind apparatus having a manual adjuster shaft; a brake caliper having a housing cavity and an inboard wall, an inboard support interface, and an outboard support interface. The inboard support interface is located within the housing cavity, outboard of the inboard wall.

15 Claims, 11 Drawing Sheets

(51) Int. Cl.
*F16D 66/02* (2006.01)
*F16D 125/28* (2012.01)

(56) References Cited

U.S. PATENT DOCUMENTS

| | | | |
|---|---|---|---|
| 4,428,462 A | 1/1984 | Warwick et al. | |
| 4,491,205 A | 1/1985 | Rath | |
| 5,433,301 A | 7/1995 | Eshghy | |
| 5,449,052 A | 9/1995 | Macke et al. | |
| 6,672,433 B2 | 1/2004 | Yamaguchi et al. | |
| 7,097,009 B2 | 8/2006 | Shao et al. | |
| 9,200,688 B2 | 12/2015 | Howard et al. | |
| 2012/0000735 A1 | 1/2012 | Iwai et al. | |
| 2012/0298456 A1 | 11/2012 | Morris et al. | |
| 2013/0008749 A1* | 1/2013 | Sandberg | F16D 65/0043 188/71.8 |
| 2014/0090934 A1 | 4/2014 | Pritz | |
| 2014/0166412 A1* | 6/2014 | Howard | F16D 65/58 188/71.8 |
| 2014/0224604 A1 | 8/2014 | Arbesman et al. | |
| 2015/0192181 A1* | 7/2015 | Asen | F16D 65/568 188/71.8 |
| 2017/0167556 A1* | 6/2017 | Knoop | F16D 55/2255 |
| 2018/0223934 A1* | 8/2018 | John | F16D 65/567 |
| 2018/0259021 A1* | 9/2018 | Weber | F16D 65/568 |
| 2019/0024742 A1* | 1/2019 | Taylor | F16D 65/183 |
| 2019/0063518 A1 | 2/2019 | Taylor et al. | |
| 2019/0063534 A1 | 2/2019 | Gibbens | |
| 2019/0072146 A1* | 3/2019 | Jungmann | F16D 65/567 |
| 2019/0257379 A1* | 8/2019 | Sandberg | F16D 65/0972 |
| 2019/0277356 A1* | 9/2019 | Knoop | F16D 55/2255 |

FOREIGN PATENT DOCUMENTS

| | | |
|---|---|---|
| EP | 0243624 A1 | 11/1987 |
| EP | 2199640 A1 | 6/2010 |
| EP | 2503175 A1 | 9/2012 |
| EP | 3 184 386 A1 | 6/2017 |
| GB | 1477755 A | 6/1977 |
| GB | 2262145 A | 6/1993 |

OTHER PUBLICATIONS

EP Examination Report dated Mar. 5, 2020, for related European Appln. No. 17188751.6; 4 Pages.

* cited by examiner

DISC BRAKE

TECHNICAL FIELD

The present invention relates to a disc brake. The present invention also relates to a method of installing an actuation mechanism of a disc brake. More particularly, but not exclusively, the present invention relates to an air actuated disc brake.

BACKGROUND

Actuation mechanisms of disc brakes, particularly air actuated disc brakes, are mounted within a caliper of the brake and transmit the actuation force from an air actuator to friction elements of the brake via tappets or pistons. A wear adjustment mechanism is typically used to compensate for wear of the friction elements in use.

Installation of an actuation mechanism including a wear adjustment mechanism can be difficult and time consuming, due to the arrangement of the wear adjustment mechanism in relation to the remainder of the brake, and the need to seal the actuation mechanism off from the external environment.

Existing wear adjustment mechanisms can interfere with maintenance of other brake components such as the pneumatic actuator, in particular where brakes are compact. It is known for a manual adjuster shaft of the adjustment mechanism to be supported by the brake housing. A seal between the shaft and the housing is provided at the exterior of the housing, in order to seal off the adjustment mechanism and the actuation mechanism, and to avoid contaminants causing corrosion of the bearing surface where the shaft extends through the housing that in turn may cause the manual adjuster shaft to seize. In such an arrangement, the adjuster shaft extends beyond the housing to provide space for a seal, and can interfere with maintenance of the pneumatic actuator or restrict the orientation at which it may be mounted with respect to the housing. Disadvantageously, installation must take place from both the inboard and the outboard sides of the brake, in order to allow the seal to be fitted.

The present invention seeks to overcome or at least mitigate the problems associated with the prior art.

SUMMARY

According to an aspect of the present invention there is provided a disc brake comprising: an actuation mechanism comprising a piston for applying an actuating force to a brake pad, and a wear adjustment mechanism for adjusting extension of the piston to account for wear of said brake pad, the wear adjustment mechanism comprising a manual rewind apparatus having a manual adjuster shaft; a brake caliper having a housing cavity for at least partly accommodating the actuation mechanism, the housing cavity being partially defined by an inboard wall of the brake caliper; and an inboard support interface and an outboard support interface where the manual adjuster shaft is supported; wherein the inboard support interface is located within the housing cavity, outboard of the inboard wall.

The manual adjuster shaft being supported within the housing cavity allows the adjustment mechanism to be more compact. Improved access to the manual adjuster shaft may be given, and greater freedom of orientation of the air actuator may be provided.

The disc brake may comprise a seal between the caliper and the adjuster shaft, wherein the seal is located at an interior face of the housing cavity.

Advantageously, a seal can be formed within the brake housing cavity, rather than external to the caliper, as there is no need for the adjuster shaft to extend through the housing for inboard support. Providing a seal within the housing allows installation of the actuation mechanism to take place from a single (outboard) side of the brake only. Installation is therefore easier and quicker.

The actuation mechanism may further comprise an operating shaft for applying an actuating force to the piston; and a roller configured to pivotably support the operating shaft, the roller comprising at least one bearing surface configured to form a pivoting interface with the operating shaft; wherein the roller may define the inboard support interface.

The roller provides a suitable location within the housing cavity to support the manual adjuster shaft.

The roller may define a first bearing surface and a second bearing surface, and the inboard support interface may be axially located between the first and second bearing surfaces of the roller.

The roller having first and second bearing surfaces is an improvement over using individual rollers, each having a bearing surface, as the portion of the roller between the bearing surfaces can be used to provide the inboard support interface, without the need for additional components in an area where space is restricted. Further, the inboard support interface may act to restrict axial movement of the roller.

The roller may be secured to the caliper. The caliper may define an aperture configured to receive an end of the roller, and wherein the roller is held in the aperture in an interference fit. The roller may be keyed to the caliper.

The disc brake may further comprise a seal between the roller and the caliper.

Securing the roller to the caliper advantageously prevents rotation of the roller with respect to the caliper, and with respect to the operating shaft. Sealing between the roller and the caliper prevents the ingress of contaminants through the roller-receiving aperture.

The inboard support interface may comprise a bore configured to receive the adjuster shaft.

The bore radially locates the adjuster shaft in relation to the inboard support interface. The bore may have a constant diameter.

The constant diameter of the bore allows insertion of the adjuster shaft through the roller.

The bore may comprise a closed profile. The bore may comprise a substantially circular profile.

The closed, circular profile of the bore radially locates the adjuster shaft in relation to the inboard support interface in all directions.

The bore may comprise an open-sided recess. The bore may comprise a curved recess. The bore may have a substantially semi-circular profile.

The open, semi-circular profile allows the adjuster shaft easily to be fitted to the inboard support interface.

The manual rewind apparatus may be located within the piston.

The location of the rewind apparatus within the piston minimizes the space required by the mechanism within the housing, so that the housing can be more compact.

There is also provided a method of installing an actuation mechanism and a roller within a caliper housing cavity of a disc brake, the actuation mechanism comprising a manual rewind apparatus having a manual adjuster shaft; the method including the steps of:

a) providing a brake caliper housing having an inboard side, an outboard side, and two opposing ends;

b) installing the roller within the housing from one or other of the ends; and c) installing the manual rewind apparatus from the outboard side such that the manual adjuster shaft is supported on the roller.

Ease and speed of installation of the actuation mechanism and the roller is increased.

The method may further comprise the step of, prior to step b: d) machining an aperture configured to receive the roller in an end of the brake housing.

The method may further comprise the step of, prior to step b: e) machining an aperture configured to receive the roller in the other end of the brake housing, wherein machining in steps d) and e) takes place from a single end of the brake housing.

According to a further aspect of the invention there is provided a disc brake comprising: an actuation mechanism comprising a piston for applying an actuating force to a brake pad, a wear adjustment mechanism for adjusting extension of the piston to account for wear of said brake pad, the wear adjustment mechanism comprising a manual rewind apparatus having a manual adjuster shaft, an operating shaft for applying an actuating force to the piston, and a roller configured to pivotably support the operating shaft, the roller comprising at least one bearing surface configured to form a pivoting interface with the operating shaft; a brake caliper having a housing cavity for at least partly accommodating the actuation mechanism, the housing cavity being partially defined by an inboard wall of the brake caliper; and a support interface where the manual adjuster shaft is supported; wherein the support interface is located within the housing cavity, outboard of the inboard wall; and wherein the roller defines the support interface.

The manual adjuster shaft being supported by the roller allows the adjustment mechanism to be more compact. Improved access to the manual adjuster shaft may be given, and greater freedom of orientation of the air actuator may be provided.

DETAILED DESCRIPTION

As required, detailed embodiments of the present invention are disclosed herein;

however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Actuation

Figure 1:
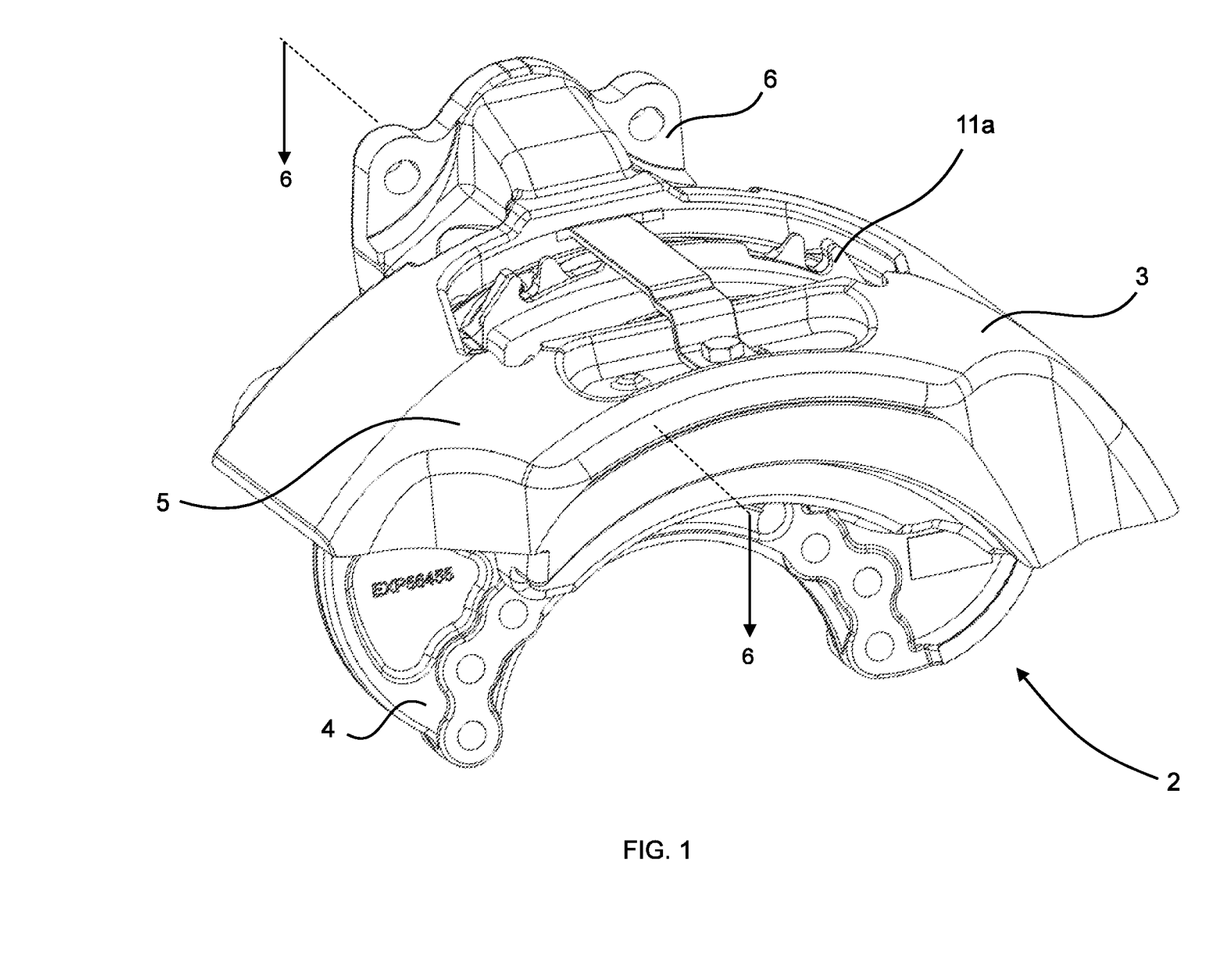
FIG. 1 is an isometric view of an example disc brake.
Figure 2:
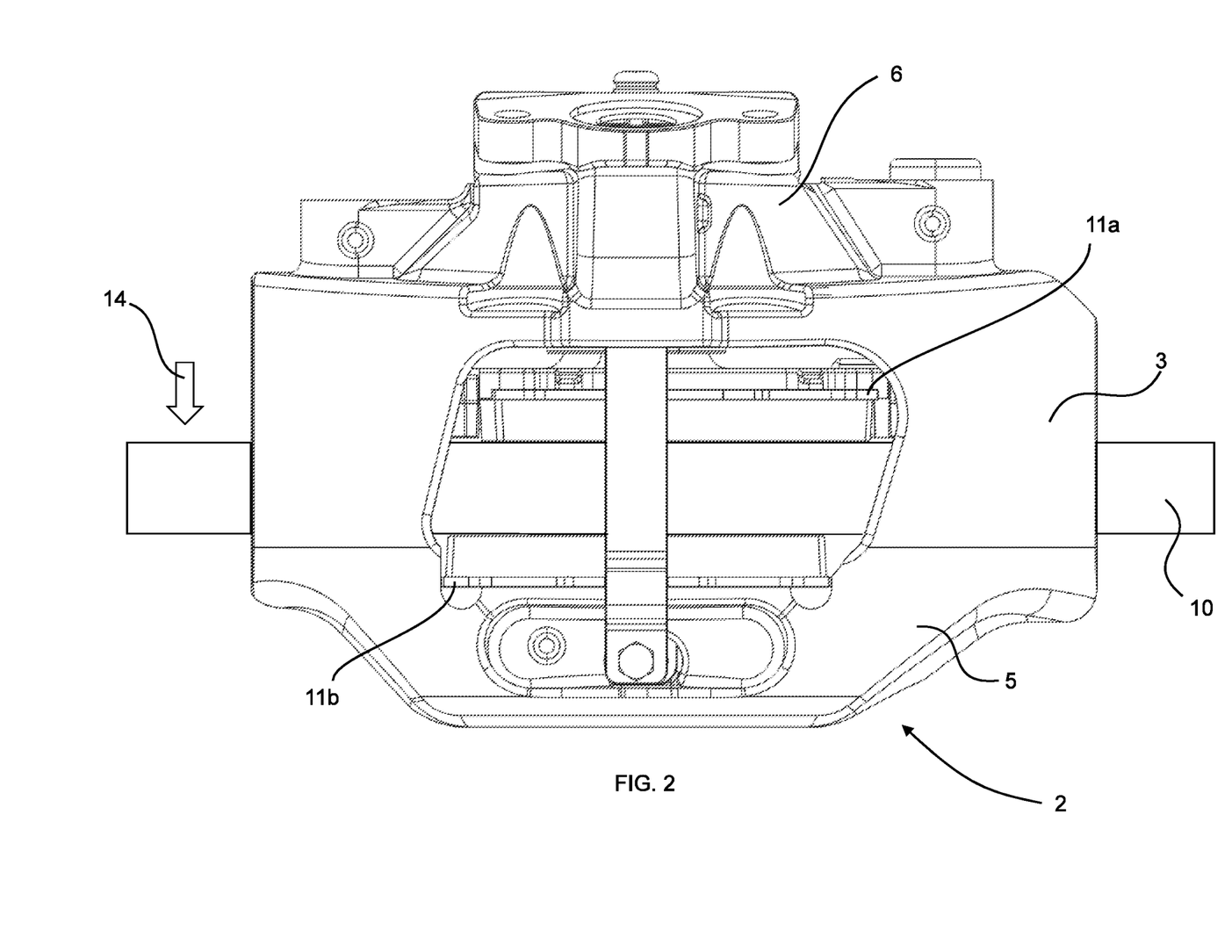
FIG. 2 is a plan view of the brake of FIG. 1, with a brake rotor in situ.
Figure 3:
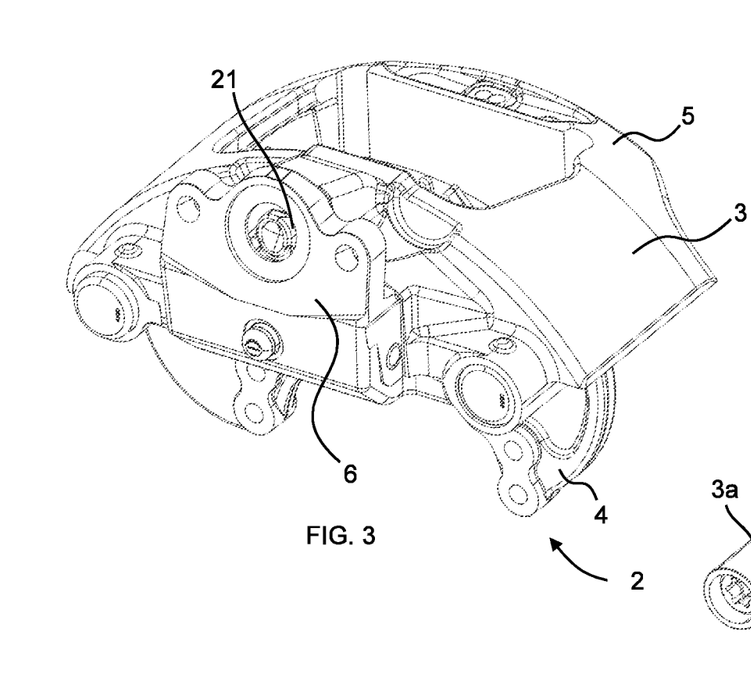
FIG. 3 is an isometric view of the brake of FIG. 1 from an inboard direction, with the inboard and outboard brake pads omitted for clarity.

FIGS. 1, 2 and 3 illustrate an example of a disc brake 2 of a type that may be adapted to incorporate the present invention. The Figures and associated description below are included to explain the function of the actuation mechanism. The disc brake incorporates an actuating mechanism comprising a single piston suitable for a commercial vehicle. This type of brake is particularly, but not exclusively, suitable for lighter duty heavy vehicles, for example smaller trucks, or a trailer of a tractor-trailer combination.

Various orientations of the disc brake are described. In particular the directions inboard and outboard refer to the typical orientation of the disc brake when fitted to a vehicle. In this orientation, the brake pad closest to the center of the vehicle is the brake pad directly actuated by an actuation mechanism, and being the inboard brake pad, and the outboard brake pad being the brake pad mounted to a bridge or frame portion of the caliper. Thus, inboard can be equated with an actuating side of the disc brake, and outboard with a reaction side. The terms radial, circumferential, tangential and chordal describe orientations with respect to the brake rotor. The terms vertical and horizontal describe orientations with the disc brake mounted uppermost on an axle, though it will be appreciated that in use such a disc brake may adopt any axle orientation depending upon packaging requirements of the vehicle.

The disc brake 2 comprises a caliper 3 having a housing 6 to accommodate the actuation mechanism, and which is slidably mounted on a carrier 4 for movement in an inboard-outboard direction.

Figure 4:
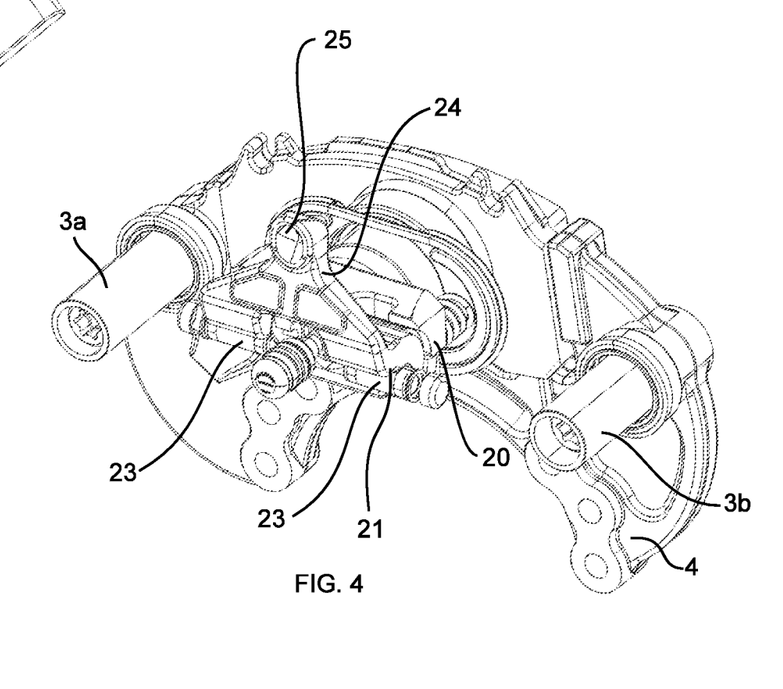
FIG. 4 is an isometric view of the brake of FIG. 1 from an inboard direction, with the outboard brake pad and a caliper housing of the brake omitted for clarity.

As can be seen from the view in FIG. 4 with the housing 6 omitted, the caliper 3 can slide on the carrier 4, by way of first and second guide pins 3a, 3b. In this embodiment, the first guide pin 3a is longer than the second guide pin 3b.

Figure 5:
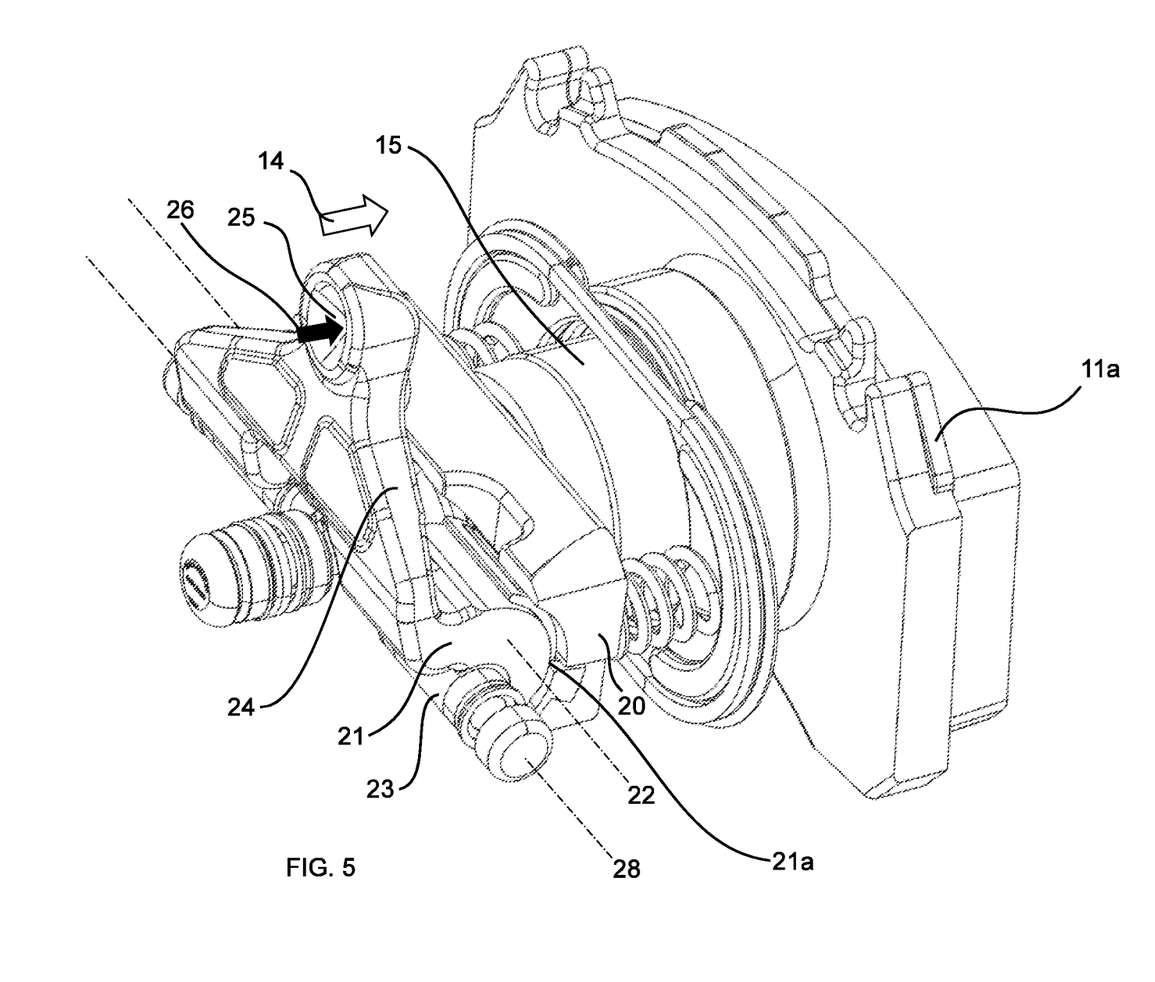
FIG. 5 is an isometric view showing an actuator arrangement of the brake of FIG. 1.

With reference to the cut-away view of FIG. 5 in particular, the inboard actuation mechanism comprises a single brake piston 15, slidable in the direction of arrow 14 (i.e., inboard-outboard) relative to the rotor 10 (not shown in FIG. 5, for clarity).

In order to urge the piston assembly in the direction of arrow 14, the operating shaft 21 is pivoted about rollers 23 which are located along a transverse axis 28. In this embodiment, there are two rollers 23, which are spaced from one another laterally. Each roller 23 is located on a single bearing surface (not shown), each bearing surface being curved to accept the roller 23. Convex surfaces 21a of the operating shaft 21 are located opposite the roller 23. The operating shaft has an axis 22, being the radial center of the arc defined by the convex surfaces 21a, which is parallel and offset from the transverse axis 28. The convex surfaces 21a locate in a semi-circular recess of a yoke 20. A surface of the yoke 20 opposite the recess is in contact with an inboard end face of the piston 15. The operating shaft 21 further comprises a lever 24 having a pocket 25 adapted to receive an output push rod (not shown) of a brake actuator (e.g., an air chamber). The lever 24 is, in this embodiment, shaped as an inverted "U" (see FIG. 4 in particular) and the line of action of the brake actuator (from pocket 25) is substantially over the line of action of the piston 15.

In other embodiments, another form of cam surface instead of the convex surfaces 21a of the operating shaft 21 may be employed (e.g., a plain bearing) and/or the arrangement may be reversed with the rollers 23 being in contact with the yoke 20, and the convex surfaces 21a being located in the recess of the caliper housing 6.

Application of a force in the direction of arrow 26 (FIG. 5) causes pivoting movement of the operating shaft 21 about the rollers 23, and the convex surfaces 21a bear on the yoke 20. The offset axes 28 and 22 cause the yoke 20 to move in the direction of the piston 15, contacting the piston 15 and causing the piston 15 to urge the friction material of an inboard brake pad 11a directly against the rotor 10. A reaction force from the operating shaft 21 is transmitted to the bearing surface of the caliper 3 via the rollers 23 and is then transmitted to an outboard brake pad 11b via the bridge 5, with the friction material of the outboard pad being urged against the rotor 10, such that the brake pads clamp the rotor and effect braking through a frictional brake force.

The actuation mechanism further incorporates a wear adjustment mechanism of a suitable type to maintain an appropriate running clearance between the brake pads 11a, 11b and the rotor 10 as the friction material wears.

Once the friction material has worn to its design limit, it is necessary for the brake pads 11a and 11b to be replaced. In order to accommodate the extra depths of unworn new pads as compared to worn old pads, it is necessary for the piston 15 to be rewound back to its retracted position.

Figure 6:
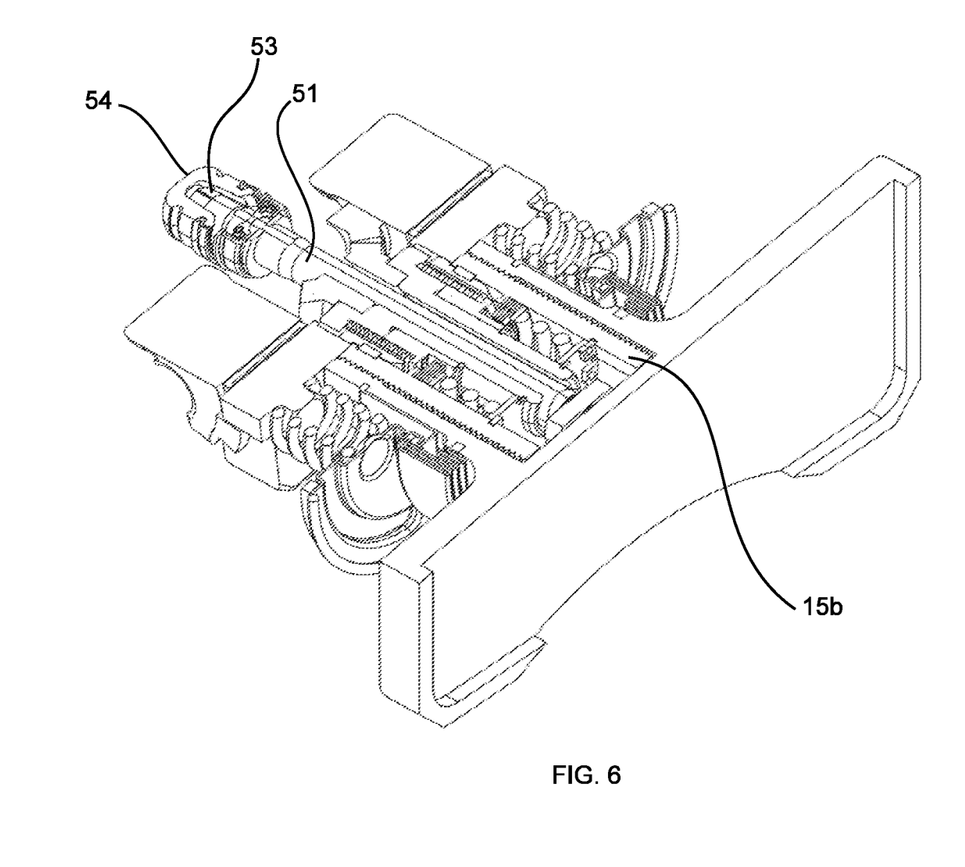
FIG. 6 is an isometric cross-sectional view through an inboard-outboard horizontal plane 6-6 of the actuator arrangement of the brake of FIG. 1.
Figure 7:
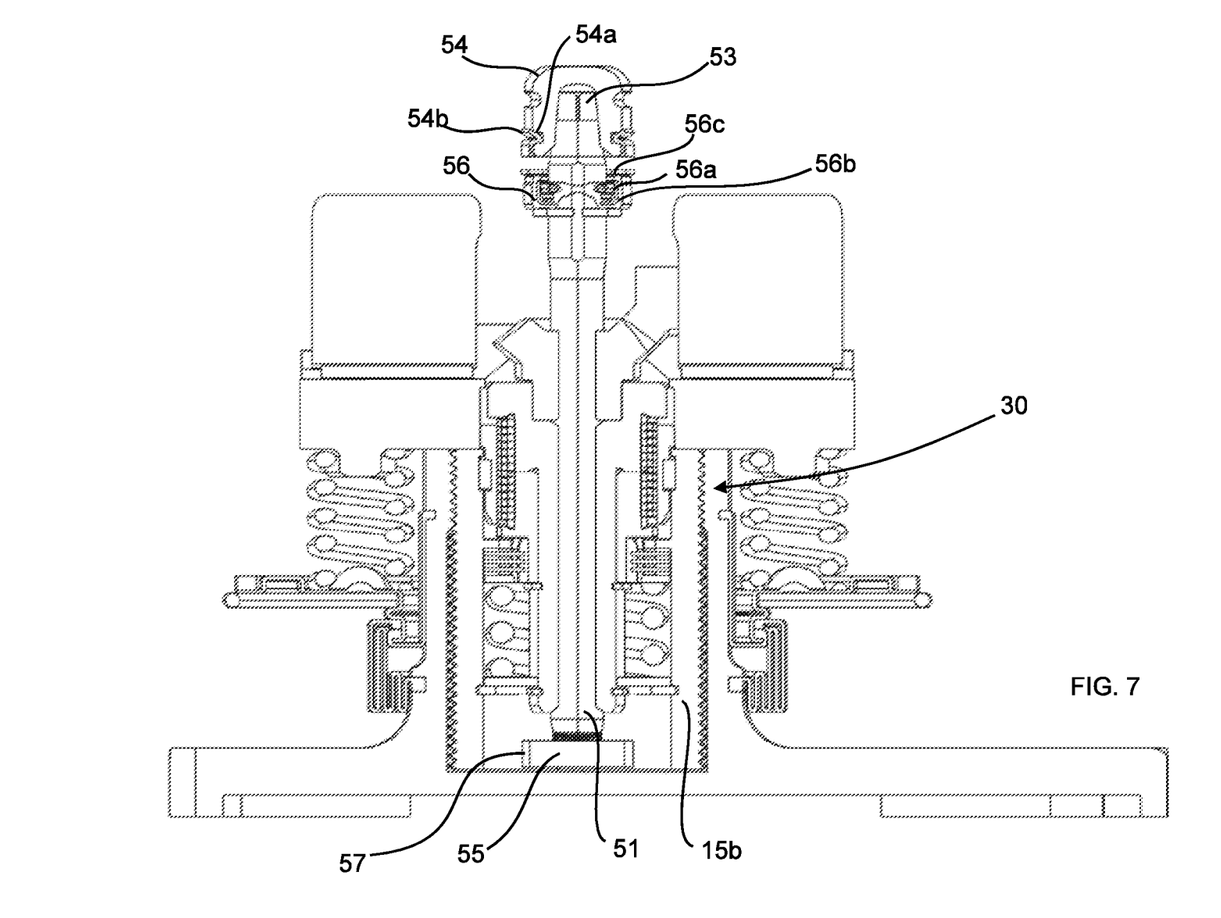
FIG. 7 is a plan view of the isometric cross-sectional view of FIG. 6.

To this end, a manual rewind apparatus incorporating an elongate manual adjuster shaft 51 is provided (see FIGS. 6 and 7). A hex head 53 or other suitable interface is provided at the outer (user accessible) longitudinal end of the manual adjuster shaft 51. The hex head 53 has a cover 54, which is located on the hex head 53. In this embodiment, the cover 54 is a rubber cap. The cover 54 can be removed by a user when access to the hex head 53 is required. A spanner, wrench or other suitable tool may be attached to the hex head 53 to affect the rewinding operation.

Located outboard of the cover 54 is a sealing arrangement in the form of a collar 56. The collar 56 is generally annular and is configured to locate on the manual adjuster shaft 51 adjacent the cover 54. The manual adjuster shaft 51 is configured such that it can freely rotate within the collar 56 e.g., by use of one or more of suitable lubrication, coatings such as PTFE, or by the collar incorporating a lip seal that minimizes the contact areas between the collar and shaft. In this embodiment, the collar 56 includes a circumferential recess 56a facing inboard. Within the recess 56a are first and second sealing members 56b and 56c. The base of the sealing member engages with the collar 56 to substantially seal lubricant within the housing 6 of the brake and help prevent foreign material from contaminating the housing 6 of the brake. In this embodiment, the second sealing member 56c is a spring energized sealing ring that engages a slot in an internal surface of the recess 56a of the collar 56, to further help seal lubricant within the housing 6 of the brake and help prevent foreign material from contaminating the housing 6 of the brake.

When the brake is assembled, the manual adjuster shaft 51, collar 56, and cover 54 are located within a through bore, extending from an inboard surface of the caliper 3. The cover 54 is retained within the housing with a retaining member 54b, which locates within a circumferential slot 54a on the external surface of the cover 54, between the cover 54 and the bore of the caliper 3. In this embodiment, the retaining member 54b is an annular retainer with an inner surface that engages the outer surface of the cover 54, and circumferential protrusion projecting radially inwardly and engaging the slot 54a. Preferably, the retaining member 54b is metal.

The manual adjuster shaft 51 is mounted concentrically and radially inwardly with respect to the components of the adjustment mechanism 30. At the outboard end longitudinally opposite the hex head 53, a piston engaging end piece 55 is mounted on the manual adjuster shaft 51. In this embodiment, the end piece 55 is circular in profile, with two diametrically opposed projections 57. The end piece 55 and the projections are dimensioned such that the projections locate within channels of the inner piston 15b. The channels allow the inner piston 15b to advance during a braking operation, whilst the manual adjuster shaft 51 is axially fixed.

In use during manual adjustment, therefore, a user rotates the hex head 53 to rotate the manual adjuster shaft 51. Due to the engagement between the projections 57 of the end piece 55 and the channels of the inner piston 15b, the inner piston 15b is caused to rotate, rewinding the piston 15 back to its original retracted position.

Brake Caliper and Wear Adjustment Mechanism

Figure 8:
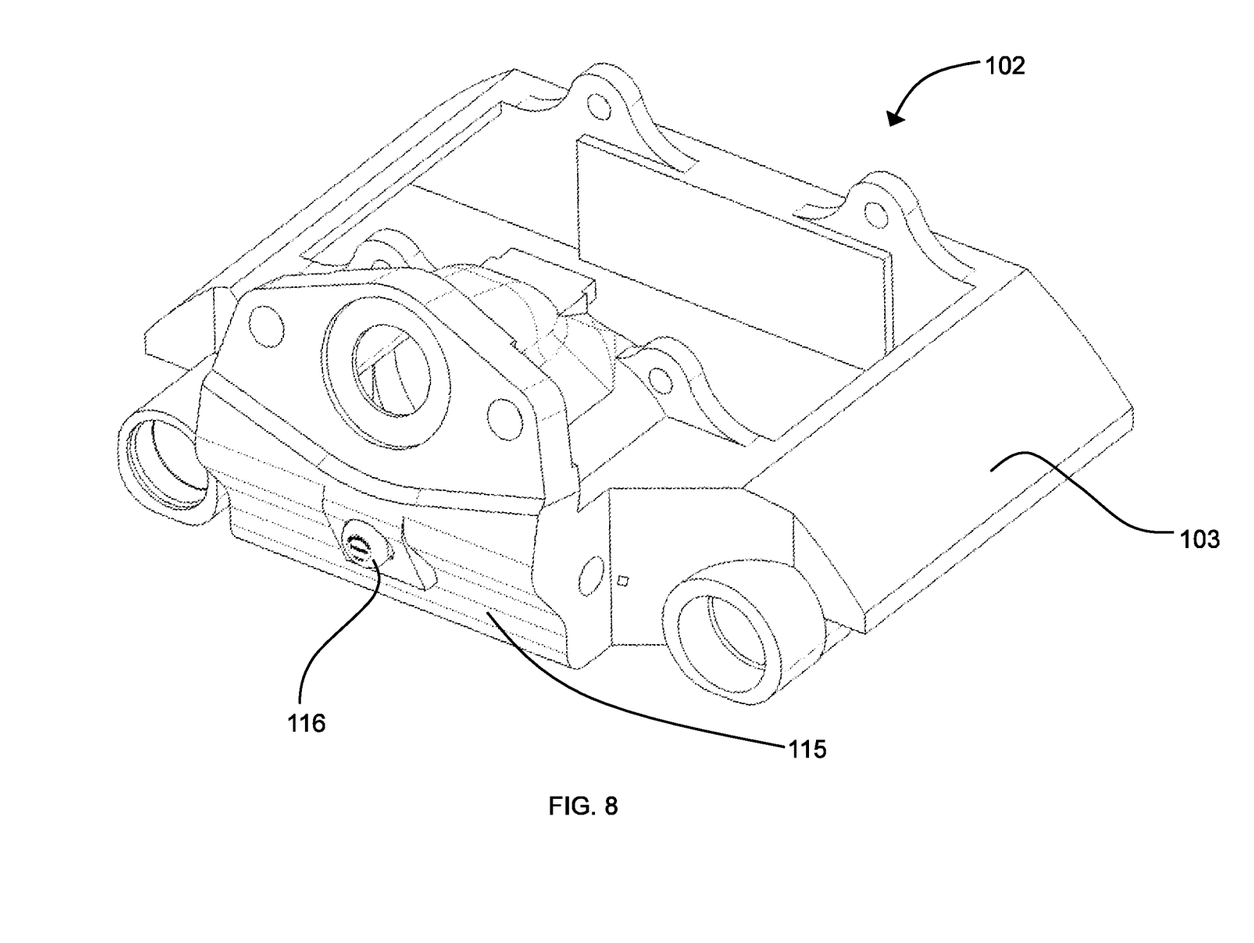
FIG. 8 is an isometric view of a brake according to an embodiment of the present invention.
Figure 9:
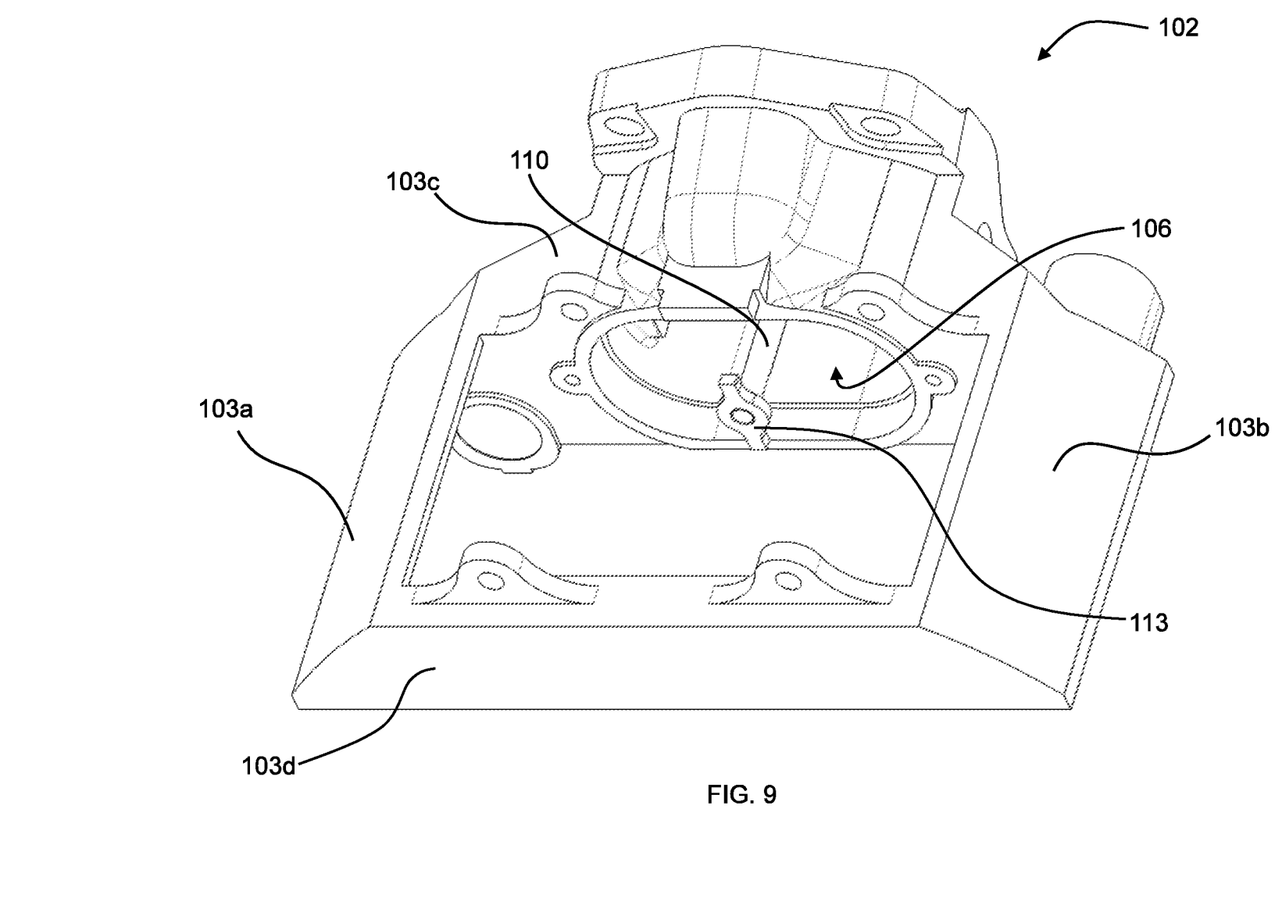
FIG. 9 is a further isometric view of the brake of FIG. 8.

Referring now to FIGS. 8 and 9, a disc brake according to an embodiment of the invention is indicated generally at 102. The disc brake 102 is similar to that described above, having an actuation mechanism 104 (see FIG. 10) housed at least partially in a brake caliper housing cavity 106. The brake caliper 103 has an inboard side 103c, an outboard side 103d, and opposing ends 103a, 103b, as indicated in FIG. 9. The housing cavity 106 is defined at the inboard side 103c of the caliper by an inboard wall 115. The actuation mechanism 104 includes a wear adjustment mechanism 108 having a manual rewind apparatus with a manual adjuster shaft 110.

Rather than a through bore 118 of the caliper acting as a plain bearing to rotationally support the manual adjuster shaft, as in the example disc brake described above, the manual adjuster shaft 110 of this embodiment is supported at an inboard support interface located within the housing cavity 106 of the caliper 103, with the inboard support interface providing a surface acting as a plain bearing. The manual adjuster shaft 110 is additionally supported by an outboard support interface. The outboard support interface of this embodiment is an end piece 113 similar to that described in the above example and which is itself supported within the piston. In alternative embodiments, the outboard support interface is provided by other suitable arrangements.

As the manual adjuster shaft 110 is supported by the inboard support interface within the housing cavity 106, sealing between the manual adjuster shaft 110 and the caliper 103 can take place at an interior of the caliper, rather than at an exterior of the caliper as in the example disc brake described above. That is, sealing takes place at an internal face of the caliper 103, i.e., a face that is not exposed to the exterior environment. There is no requirement for sealing at, for example, an exterior face of the inboard wall 115 adjacent to a bore of the caliper. The manual adjuster shaft 110 does not therefore need to extend beyond the outside of the caliper 103 to allow sealing to take place and extends beyond the outside of the caliper 103 less than the shaft of the example disc brake of FIGS. 1 to 7. Space is saved by the shorter manual adjuster shaft 110, giving more room for maintenance of, for example, the pneumatic actuator, or to allow the pneumatic actuator to be fitted at a wider range of orientations with respect to the housing without obscuring or impinging on the end of the shaft.

A sealing arrangement 114, substantially the same as the sealing arrangement described above is provided, as shown in FIG. 11. However, in this embodiment, the sealing arrangement 114 forms a seal with an internal face 120 of the caliper 103. In this embodiment, the sealing arrangement 114 is located within the inboard wall 115. The manual adjuster shaft 110 is rotatable within the sealing arrangement 114. Advantageously, the actuation mechanism 104 can be installed in the caliper 103 from a single side, i.e., the outboard side, of the disc brake 102. Further, since the through-bore 118 is not used as a bearing, a greater clearance between it and the manual adjuster shaft 110 can be provided. As a result, any corrosion inboard of the seal is unlikely to result in seizing of the shaft.

Figure 11:
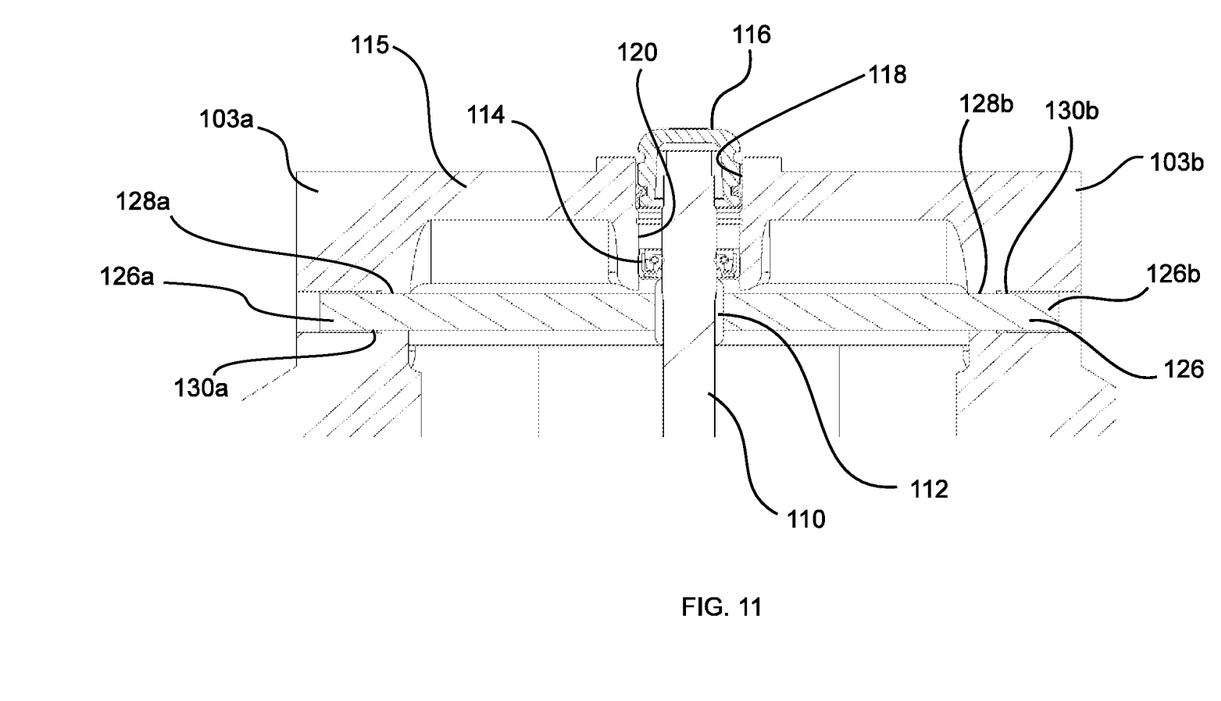
FIG. 11 is a cross-sectional view through the brake of FIG. 8 on a horizontal plane 11-11, as shown on FIG. 10, aligned with the axis of the manual adjuster shaft.

A cover, in this embodiment in the form of a rubber cap 116 protects the exposed end of the manual adjuster shaft 110. The cap 116 can be fitted to the manual adjuster shaft 110 prior to installation, allowing installation of the adjustment mechanism from the outboard side.

In contrast to the above-described example, in this embodiment a single roller 126 (see FIG. 10) pivotably supports the operating shaft 124. The roller 126 provides a bearing surface or surfaces 122 where the operating shaft 124 is pivotably supported. In this embodiment, the roller provides two bearing surfaces 122 where the operating shaft 124 is pivotably supported.

Figure 10:
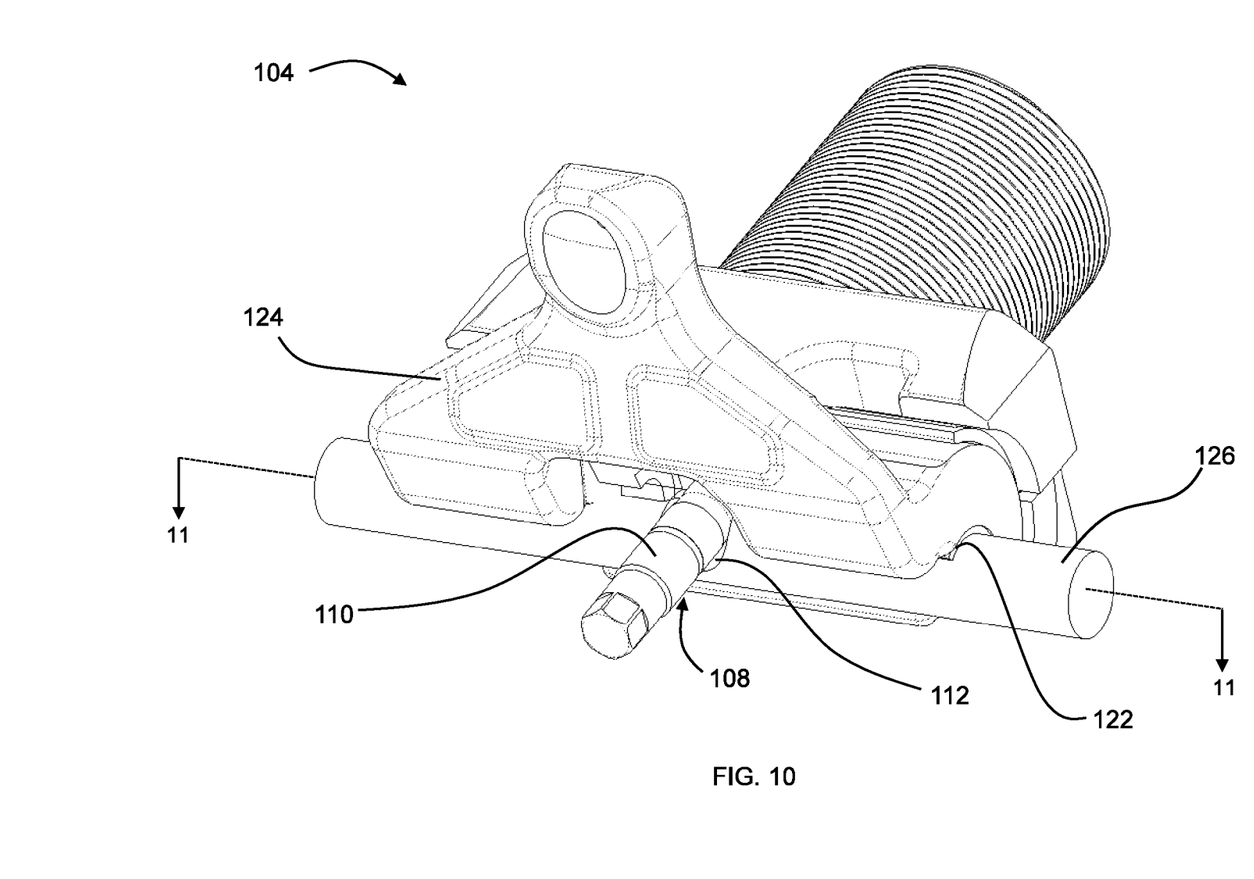
FIG. 10 is an isometric view of the brake of FIG. 8 with the brake caliper omitted for clarity.

In this embodiment, the inboard support interface is provided by the roller 126. The location of the roller 126 within the housing cavity 106 enables the roller 126 to provide a suitable location for the inboard support interface within the housing cavity 106. Advantageously, the roller 126 providing the inboard support interface removes the need for an additional supporting component.

Figure 12:
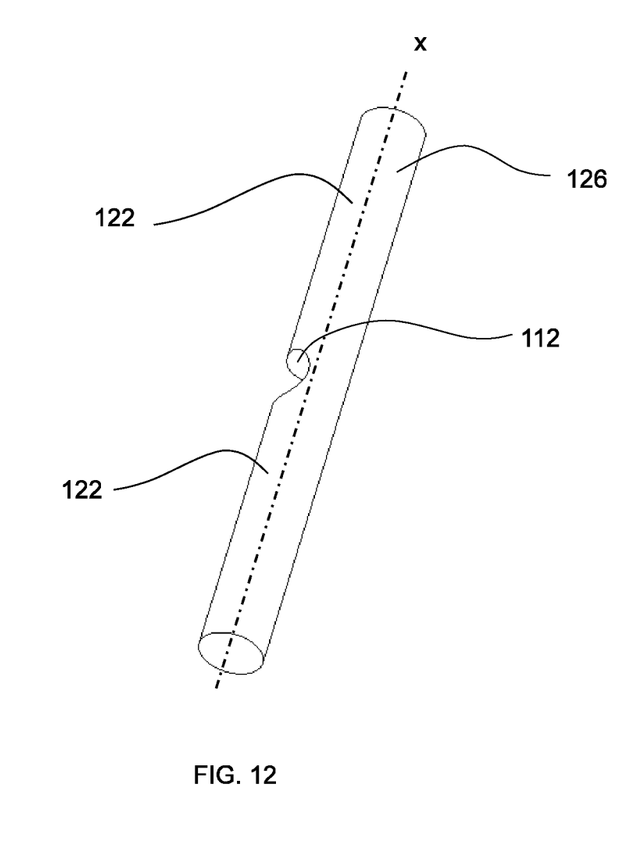
FIG. 12 is an isometric view of a roller of the brake of FIG. 8.

The inboard support interface is in this embodiment located between the two bearing surfaces 122 along a longitudinal axis x of the roller 126. In this embodiment, the inboard support interface is provided in the form of a bore. As shown in FIG. 12, in this embodiment, the bore is an open-sided, curved recess 112, with a substantially semi-circular profile. In an alternative embodiment, the recess is deeper, or may be shallower. The open-sided recess 112 improves ease of installation of the manual adjuster shaft 110.

Figure 13:
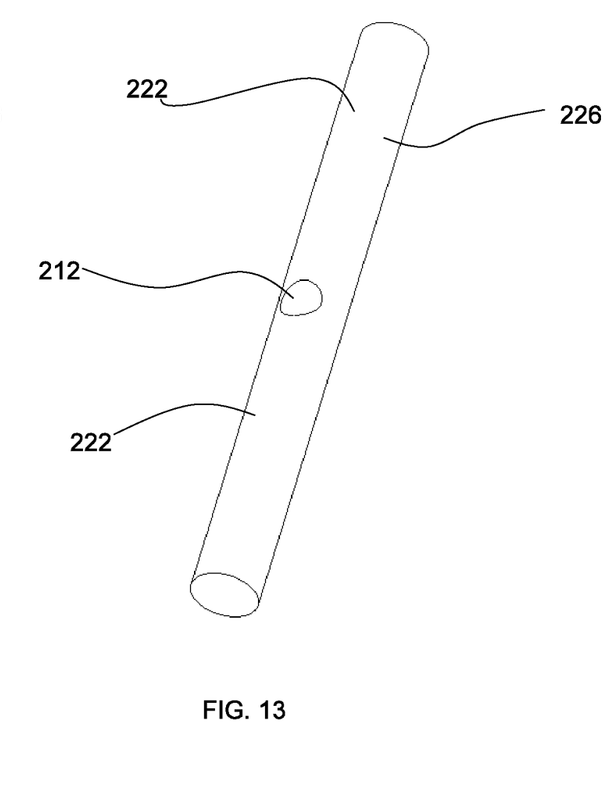
FIG. 13 is an isometric view of an alternative roller of the brake of FIG. 8.

A roller 226 of an alternative embodiment is shown in FIG. 13. The inboard support interface of the roller 226 is a closed bore 212, with a substantially circular profile. The closed bore 212 locates the manual adjuster shaft 110, improving ease of installation of the manual adjuster shaft 110 through the bore 118.

The roller 226 provides a bearing surface or surfaces 222 where the operating shaft is pivotably supported. In this embodiment, the roller provides two bearing surfaces 222 where the operating shaft is pivotably supported.

The roller 126 of this embodiment is secured to the caliper 103, in order to prevent unwanted rotation of the roller 126, and so to prevent the roller 126 affecting rotation of the manual adjuster shaft 110. Opposing ends 103a, 103b of the caliper 103 each define an aperture 128a, 128b configured to receive respective ends 126a, 126b of the roller 126 in an interference fit. In an alternative embodiment, rather than an interference fit, the roller ends are keyed to the caliper to prevent rotation. In a further alternative embodiment, the roller ends and the caliper apertures have a corresponding non-circular shape in order to prevent rotation of the roller. Seals 130a, 130b are provided at each of the roller ends to prevent the ingress of contaminants.

In production, the caliper 103 is cast. The apertures 128a, 128b are machined into the caliper 103, for example by milling from one end 103a, 103b of the caliper 103. A curved support surface (not shown) for the roller 126, 226 is milled from the caliper 103. The milling tool is supported at an end of the caliper 103. Where the inboard support interface is provided by the roller, milling of the entire roller support surface of the caliper 103 can advantageously take place from a single end of the caliper 103. This is because in such an embodiment, there is no need for a protruding abutment to control axial movement of a roller that would otherwise prevent milling from a single end. A block of excess material is cast along the roller support surface in the intended path of the milling tool when the caliper casting is produced. This excess is then milled away during machining. Advantageously, it has been found that such an arrangement reduces transverse loads on the milling tool during machining when it is cantilevered to this extent, in comparison to milling away a few millimeters of material with a side portion of the tool only.

The roller 126, 226 is machined, then is case-hardened after machining.

On installation of the actuation mechanism 104 and the roller 126, 226 within the disc brake 102, the sealing arrangement 114 is first assembled and fitted to the caliper 103. The roller 126, 226 is inserted from one of the ends 103a, 103b of the caliper 103. The manual adjuster shaft 110 and the remainder of the manual rewind apparatus are then installed.

Although the above embodiments are described in relation to a single piston disc brake, the invention could be used with a twin piston disc brake, or alternative suitable types of brake. For example, the invention could be fitted to a twin piston disc brake with a central manual adjuster shaft. Alternatively, the roller could extend further to one side or another to support an offset manual adjuster shaft. In an alternative embodiment, the inboard support interface is not provided by a single extended roller. For example, in one embodiment, the inboard support interface is provided by a support component provided with a bearing surface and fitted to a pocket milled into the caliper, for example between first and second rollers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake comprising:
   an actuation mechanism that includes:
   a piston for applying an actuating force to a brake pad,
   an operating shaft for applying actuating force to the piston,
   a roller configured to pivotably support the operating shaft, the roller having at least one bearing surface configured to form a pivoting interface with the operating shaft, and a wear adjustment mechanism for adjusting extension of the piston to account for wear of the brake pad, the wear adjustment mechanism including a manual rewind apparatus having a manual adjuster shaft;

a brake caliper having a housing cavity for at least partly accommodating the actuation mechanism, the housing cavity being partially defined by an inboard wall of the brake caliper; and an inboard support interface that supports the manual adjuster shaft and an outboard support interface that supports the manual adjuster shaft, wherein the inboard support interface is located within the housing cavity, outboard of the inboard wall, and wherein the manual adjuster shaft is not supported by the inboard wall, wherein the roller defines the inboard support interface.

2. The disc brake of claim 1 further comprising a seal in contact with the brake caliper and the manual adjuster shaft, wherein the seal is located at an interior face of the housing cavity.

3. The disc brake of claim 1 wherein the roller defines a first bearing surface and a second bearing surface, and wherein the inboard support interface is axially located between the first and second bearing surfaces of the roller.

4. The disc brake of claim 1 wherein the roller is secured to the brake caliper.

5. The disc brake of claim 4 wherein the brake caliper defines an aperture configured to receive an end of the roller, and wherein the roller is held in the aperture in an interference fit.

6. The disc brake of claim 4 wherein the roller is keyed to the brake caliper.

7. The disc brake of claim 4 further comprising a seal located between the roller and the brake caliper.

8. The disc brake of claim 1 wherein the inboard support interface further comprises a bore configured to receive the manual adjuster shaft.

9. The disc brake of claim 8 wherein the bore has a constant diameter.

10. The disc brake of claim 8 wherein the bore has a closed profile.

11. The disc brake of claim 10 wherein the bore has a substantially circular profile.

12. The disc brake of claim 8 wherein the bore has an open-sided recess.

13. The disc brake of claim 12 wherein the open-sided recess is a curved recess.

14. The disc brake of claim 12 wherein the bore has a substantially semi-circular profile.

15. The disc brake of claim 1 wherein the manual rewind apparatus is located within the piston.

* * * * *